United States Patent [19]

Vinokurov et al.

[11] 4,174,483
[45] Nov. 13, 1979

[54] CRYOGENICALLY COOLED ELECTRICAL MACHINE

[76] Inventors: Alexandr A. Vinokurov, ulitsa Polzunova, 31, kv. 314; Gennady S. Gorbunov, ulitsa Polzunova, 35, kv. 32; Anatoly G. Korolkov, ulitsa Ivanova, 5, kv. 71; Jury S. Popov, ulitsa Bariernaya, 16, kv. 14; Lev M. Rozenfeld, ulitsa Pravdy, 7a, kv. 30, all of Novosibirsk; Jury V. Skachkov, Nevsky prospekt, 125, kv. 13, Leningrad; Iosif F. Filippov, ulitsa Pulkovskogo, 17, kv. 39, Leningrad; Gary M. Khutoretsky, ulitsa Altaiskaya, 20, kv. 5, Leningrad, all of U.S.S.R.

[21] Appl. No.: 855,778

[22] Filed: Nov. 29, 1977

[51] Int. Cl.² ............................................... H02K 9/00
[52] U.S. Cl. ..................................................... 310/52
[58] Field of Search ..................... 310/10, 40, 52, 64

[56] References Cited

U.S. PATENT DOCUMENTS

| 3,648,082 | 3/1972 | MacNab | 310/10 |
| 3,679,920 | 7/1972 | MacNab | 310/52 |
| 4,020,371 | 4/1977 | Gillet | 310/52 |
| 4,063,122 | 12/1977 | Kullman | 310/10 |
| 4,076,988 | 2/1978 | Litz | 310/52 |
| 4,085,343 | 4/1978 | Hasegawa | 310/52 |

*Primary Examiner*—R. Skudy
*Attorney, Agent, or Firm*—Lackenbach, Lilling & Siegel

[57] ABSTRACT

A cryogenically cooled electrical machine comprises a superconducting field winding placed inside a hollow rotor surrounded by a cooled magnetic shield and a heat shield. The magnetic shield is arranged within the heat shield and is cooled by a coolant circulating in ducts made in the heat shield, the heat and magnetic shields being arranged within an evacuated space between the rotor and the shell of the electrical machine. This embodiment of the electrical machine makes it possible to increase the efficiency of thermal protection of the superconducting field winding.

7 Claims, 5 Drawing Figures

CRYOGENICALLY COOLED ELECTRICAL MACHINE

FIELD OF THE INVENTION

The present invention relates to electrical machines and, more particularly, to cryogenically cooled electrical machines.

The invention is suitable for use in all kinds of electrical machines: electric motors, generators and converters employed at nuclear, thermal and other power plants and, also, in transport and on aircraft. The present invention may also find extensive use in outer space power plants. It can be used to advantage in other equipment and installations utilizing the phenomenon of superconduction, to shield the superconductor from the effect of time-varying magnetic fields.

DESCRIPTION OF THE PRIOR ART

Cryogenically cooled electrical machines of conventional design are known to have a superconducting field winding fixed to a hollow rotor enclosed in a hermetically sealed heat-insulating shell having a protective vacuum. The superconducting field winding has a cryogenic cooling system. The low-temperature zone of the superconducting field winding needs thermal insulation, because it has to be protected both against convective and radiant influx of heat and, also, against the effect of the variable distribution of the magnetic field at the armature winding side due to the harmonic and subharmonic components of the magnetic field, including an alternating current of at least 6-times the rated frequency within the field winding. This results in additional losses in the superconducting winding.

Superconductors of the second order, while allowing for a high induction, are subject to comparatively high a.c. losses. Available data on these losses is rather contradictory. Yet, even if those losses be scores of thousands of times smaller than those occuring at room temperature, the power losses within the cryogenic system of cooling still remain prohibitive.

To reduce the convective component of the heat influx use is made of vacuum insulation provided, as a general rule, by two annular vacuum gaps, and the radiant component is reduced by installing heat shields inside the annular gaps. The superconducting field winding is protected against the effect of the varying distribution of the magnetic flux by the installation of an additional magnetic shield made either of a material of high electric and thermal conductivity or of a superconducting material.

Known in the art is a cryogenically cooled electrical machine comprising a superconducting field winding placed in a hollow rotor surrounded by a magnetic shield of a superconducting material.

The magnetic shield of the known machine is made up of long superconducting fibres enclosed in a sheathing of a material having a high thermal conductivity. The shield is arranged directly on the outer surface of the rotor and is cooled by virtue of its being coupled, by its thermal conductance, with the superconducting winding of the rotor.

Such an arrangement of the shield is of low efficiency since the heat liberated in the shield by the alternating magnetic fields is in immediate proximity to the superconducting winding. This circumstance calls for an additional consumption of the cooling agent, and the power needed to compensate for that heat may be quite considerable.

SUMMARY OF THE INVENTION

It is an object of the present invention to improve the efficiency of thermal insulation of the superconducting field winding and, in consequence, to increase the efficiency of the electrical machine.

This object is attained by a cryogenically cooled electrical machine comprising a superconducting field winding placed in a hollow rotor surrounded by a heat shield and cooled by a magnetic shield. In accordance with the invention, the magnetic shield is arranged inside the heat shield and cooled with the aid of a coolant circulating in ducts provided in the heat shield, the heat and magnetic shields being arranged within an evacuated space between the rotor and the shell of the electrical machine.

Such an embodiment of the electrical machine allows the field winding to be protected from the effect of the heat produced in the magnetic shield and, consequently, the consumption of the coolant to be reduced and the efficiency of the electrical machine to be increased.

It is preferable to make the heat shield of at least two coaxial cylinders, to arrange the magnetic shield between the cylinders and to it coupled rigidly therewith, the ducts for circulation of the cooling agent being helically disposed along the conjugated surfaces of the magnetic shield and the cylinders.

It is also preferable, for the electrical machine to be simpler to manufacture, to couple the outer and inner surface of the magnetic shield rigidly with the heat shield by a threaded joint with gaps for circulation of the coolant.

It is also preferable that the ducts for circulation of the coolant communicate with at least two flat annular inlet and outlet chambers arranged coaxially on the rotor and adjoining at least one of the end surfaces of the heat shield.

To increase the rate of flow of the coolant along the ducts, it is preferable to provide the flat annular chamber for the inlet of the coolant with a means for forcing the coolant into the ducts circulating the coolant, and to provide the flat chamber for the outlet of the coolant with a means for sucking the coolant out of the ducts, thus creating a pressure drop of the circulating coolant.

For impactless circulation of the coolant and uniform cooling of the end surfaces of the flat annular chamber for the inlet of the coolant, the means for forcing the coolant into the ducts may be in the form of vanes fixed to the end surfaces of the flat annular chambers.

For impactless outlet of the coolant from the circulation ducts, the coolant sucking means may be made as a spirally wound strip fixed to the end surfaces of the annular chamber.

BRIEF DESCRIPTION OF THE DRAWINGS

Other objects and advantages of the invention will become apparent from the following detailed description of preferred embodiments thereof, taken in conjunction with the accompanying drawings, wherein.

DETAILED DESCRIPTION OF THE INVENTION

Figure 1:
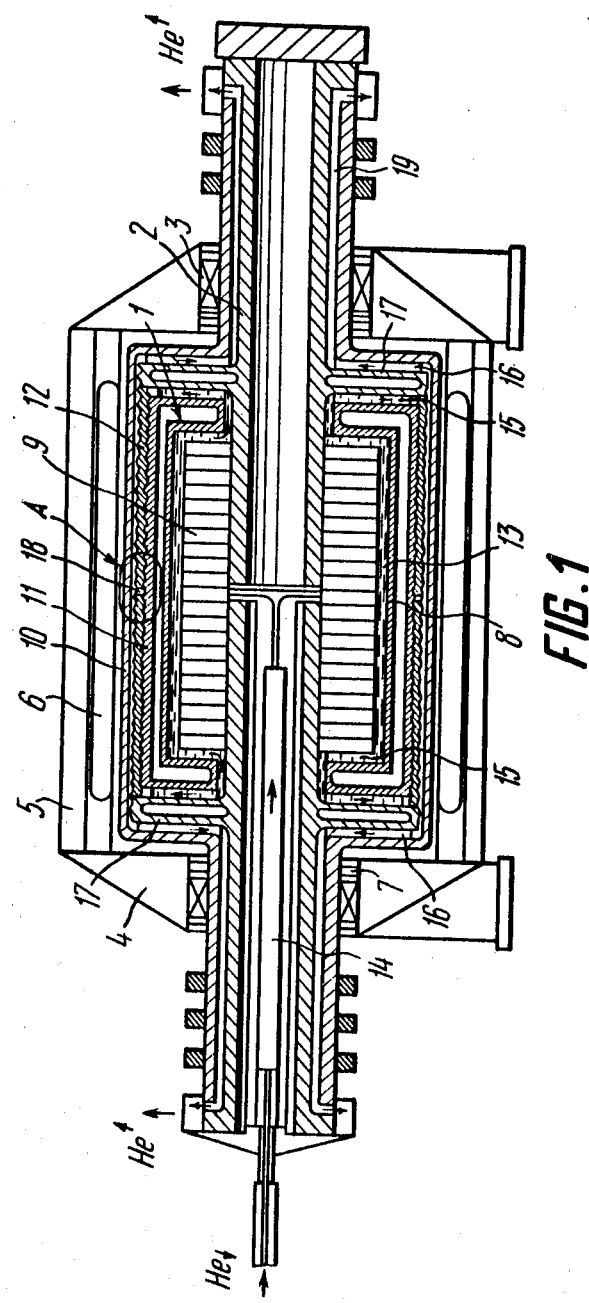
FIG. 1 is a longitudinal section view of a cryogenically cooled electrical machine in accordance with the present invention.

The cryogenically cooled electrical machine comprises a hollow rotor 1 (FIG. 1), whose shaft 2 rests in bearings 3 arranged within end shields 4 of a hermetically sealed shell 5. On an inner surface of the shell 5 a stator winding 6 is arranged. A vacuum for thermal insulation of the rotor 1 is maintained in the space between the rotor 1 and the shell 5 of the electrical machine. Proper sealing is ensured by rotating vacuum seals 7 provided within the end shields 4 of the machine.

The hollow rotor 1 comprises a non-magnetic cylinder 8 containing a superconducting field winding 9. The field winding 9 is fixed in place with an epoxy compound and is made of a superconducting material, e.g., tin niobite (NbSn). It may also be made of other materials of high conductivity, such as zirconium niobite or titanium niobite.

The space between the frame 5 and the non-magnetic cylinder 8 accommodates a heat shield of non-magnetic material made in the form of two coaxial cylinders 10 and 11 with a magnetic shield 12 arranged therebetween. The magnetic shield 12 is made of a superconducting material, for instance, $Nb_3Sn$, and a material of high electric conductivity, e.g., copper or aluminum. The superconducting material may be deposited on the surface of the electrically conducting material by sputtering. The magnetic shield 12 may also be made of fibres of a superconducting material, arranged within the electrically conducting material.

The field winding 9 is cooled to a superconducting state by a coolant 13 filling the non-magnetic cylinder 8. Liquid helium is the preferred coolant.

Figure 2:
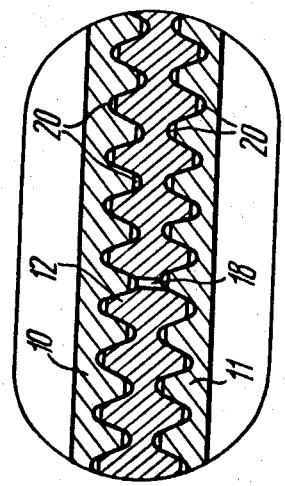
FIG. 2 is an enlarged sectional view of portion A of FIG. 1 in accordance with the invention.

To bring the coolant 13 to the field winding 9, the shaft 2 of the rotor 1 is provided with an axial duct containing a pipe 14. Two flat annular chambers 15 adjoin the end surfaces of the heat shield for the inlet of the coolant 13, and two flat annular chambers 16 are arranged coaxially with the chambers 15 for the outlet of the coolant 13. The chambers 15 and 16 adjoining one end surface of the heat shield are defined by the end walls of the outer and inner coaxial cylinders 10 and 11, the heat shield and a hollow partition 17. The magnetic shield 12 has holes 18 made equidistant from the ends of the shield to return the coolant 13. The chambers 16 for the outlet of the coolant 13 communicate with ducts 19 provided in the shaft of the rotor 1 to expel the coolant 13. The magnetic shield 12 is cooled with the aid of the coolant drawn out of the non-magnetic cylinder 8. The coolant 13 circulates along ducts 20 (FIG. 2) running helically along the conjugated surfaces of the magnetic shield 12 and cylinders 10 and 11.

The ducts 20 for circulating the coolant 13 are essentially gaps formed in the threaded joint of the magnetic shield 12 and the outer and inner cylinders 10 and 11 of the heat shield because of the incomplete profile of the thread.

It is preferable that the thread be of the multiple-start type so as to enlarge the heat exchange surface. The ends of the the cylinders have L.H. and R.H. threads cut up to the holes 18.

Figure 3:
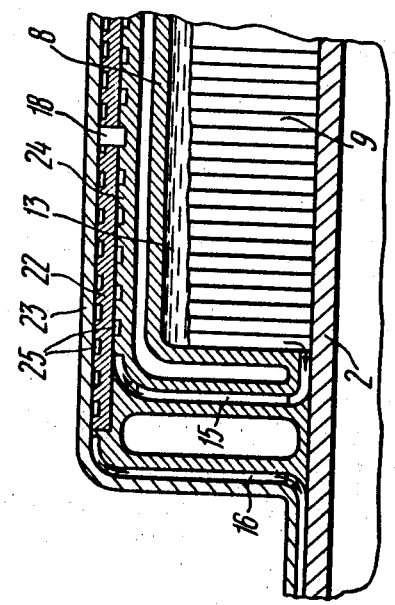
FIG. 3 is a fragmentary sectional view of another embodiment of the magnetic and heat shields with flat annular chambers, in accordance with the invention.

FIG. 3 shows another version of coupling the magnetic shield and the outer and inner cylinders 23 and 24 of the heat shield.

The magnetic shield 12 is in the form of a copper cylinder 22 with a superconducting layer of $Nb_3Sn$ deposited on its outer and inner surfaces. The cylinders 23, 24 and 22 are coupled by a heavy-drive fit. Ducts 25 for circulation of the coolant 13 run helically along the conjugated surfaces of the magnetic shield 12 and cylinders 23 and 24, and are of a rectangular profile.

Figure 4:
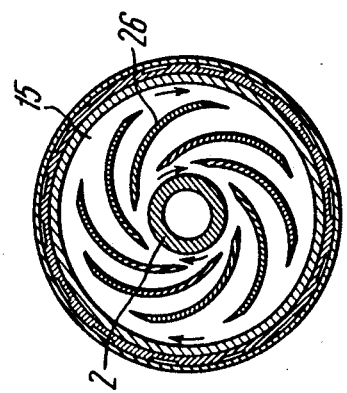
FIG. 4 is a cross-sectional view of the flat annular chamber for the inlet of the coolant, in accordance with the invention.

The flat annular chamber 15 for the inlet of the coolant 13 comprises centrifugal vanes 26 (FIG. 4) fixed rigidly to the end surfaces of the chamber 15.

Figure 5:
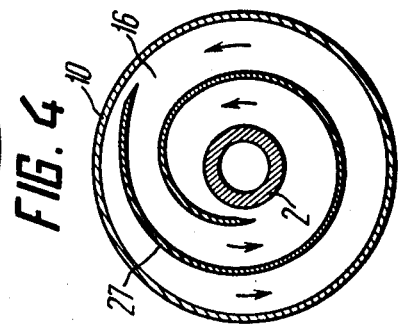
FIG. 5 is a cross-sectional view of the flat annular chamber for the outlet of the coolant, in accordance with the invention.

The flat annular chamber 16 for the outlet of the coolant 13 has a partition made of a strip 27 (FIG. 5) spirally wound and fixed rigidly to the end surfaces of the chamber 16.

The liquid helium serving as the coolant 13 is supplied through the pipe 14 to the superconducting field winding 9, cools the winding 9 and is then delivered to the chambers 15 arranged at both ends of the magnetic shield.

When the rotor 1 running, the evaporating helium enters the flat annular chambers 15, flows from the center to the periphery and, in so doing, cools the walls of the chambers 15. As the rotor 1 rotates, the vanes 26 draw in the coolant 13 and impart a certain peripheral velocity. In consequence, the centrifugal forces acting upon the coolant 13 suck it out from the non-magnetic cylinder 8 and force it into the ducts 20. The coolant 13 circulates further along the helically running ducts 20 made in the inner cylinder 11 of the heat shield and is then supplied via the holes 18 into the ducts 20 made in the outer cylinder 10. On circulating along the helically running ducts 20, the coolant 13 retains the rotary component of its velocity and smoothly enters the flat annular chambers 16 where a strip 27 serves as a means for sucking the coolant 13 out from the ducts 20, thus creating a drop in the pressure of the circulating coolant 13. Then, the coolant 13 is delivered to the outlet ducts 19, cools the end walls of the chambers 16 and is expelled from the rotor of the machine.

Such an embodiment of the cryogenically cooled electrical machine makes it possible to remove the heat produced in the magnetic shield by the alternating magnetic fields.

Moreover, it raises the efficiency of thermal protection of the superconducting field winding by reducing the influx of heat from the ends of the electrical machine, this being ensured by the provision of flat annular chambers at both ends of the machine.

What is claimed is:

1. A cryogenically cooled electrical machine comprising:
   a hermetically-sealed shell;
   a stator winding fixed in place within said shell;
   a hollow rotor arranged inside said stator winding;
   a superconducting field winding placed within said hollow rotor;
   a heat shield surrounding said hollow rotor and having ducts for circulation of a coolant;
   a magnetic shield arranged inside said heat shield and said magnetic shield and said heat shield being arranged within an evacuated space between said rotor and said shell.

2. An electrical machine according to claim 1, wherein:
said heat shield is made of at least two coaxial cylinders,
said magnetic shield is arranged between and rigidly coupled to said cylinders of the heat shield, and
outer and inner surfaces of said magnetic shield and said cylinders of said heat shield are conjugated.

3. An electrical machine according to claim 2, wherein
said magnetic shield is coupled rigidly with said heat shield by a threaded joint with gaps for circulation of the coolant.

4. An electrical machine according to claim 3, wherein:
at least two flat annular chambers for the inlet of said coolant to said ducts for circulation of said coolant adjoin at least one end surface of said heat shield and
communicate with said ducts for circulating the coolant; and
at least two flat annular chambers for the outlet of said coolant from said ducts adjoin a respective flat annular chamber for the inlet of the coolant and communicate with said ducts for circulating the coolant.

5. An electrical machine according to claim 4, further comprising:
a means for forcing the coolant into said ducts for circulation of the coolant arranged in said chamber for the inlet of the coolant; and
a means for sucking the coolant out from said ducts for circulation of the coolant arranged in said chamber for the outlet of the coolant and creating a pressure drop of the circulating coolant.

6. An electrical machine according to claim 5, further comprising:
vanes fixed to end surfaces of said flat annular chamber for the inlet of the coolant, to force the coolant into said ducts for circulation of the coolant.

7. An electrical machine according to claim 6, further comprising:
a spirally wound strip fixed to end surfaces of said flat annular chamber for the outlet of the coolant, to suck the coolant out from said ducts for circulation of the coolant.

* * * * *